United States Patent [19]
Matsushita et al.

[11] 4,181,649
[45] Jan. 1, 1980

[54] METHOD OF SEPARATING PEPTIDES

[75] Inventors: Susumu Matsushita; Tetsuo Ikushige, both of Shin-Nanyo, Japan

[73] Assignee: Toyo Soda Manufacturing Co., Ltd., Yamaguchi, Japan

[21] Appl. No.: 900,126

[22] Filed: Apr. 26, 1978

[30] Foreign Application Priority Data

Apr. 28, 1977 [JP] Japan .................... 52-48380

[51] Int. Cl.² ............................. C07C 103/52
[52] U.S. Cl. ..................... 260/112.5 R; 210/31 C
[58] Field of Search ........... 210/31 R, 31 C, 198 C, 210/; 260/112 R, 112.5 R

[56] References Cited
U.S. PATENT DOCUMENTS

| | | | |
|---|---|---|---|
| 3,502,545 | 3/1970 | Westman et al. | 210/31 C |
| 3,850,798 | 11/1974 | Sjoquist | 210/31 C |
| 4,116,948 | 9/1978 | Mittenzwei et al. | 210/31 C |

OTHER PUBLICATIONS

Mutt et al., *Use of "Lipophilic" Sephadex in Peptide Synthesis*, J. Chromatog., 24 (1966) pp. 205–207.
Nystrom et al., *Separation of Protected Peptides on Methylated Sephadex*, J. Chromatog., 24 (1966) pp 208–212.
Kirkland, J. J. *Modern Practice of Liquid Chromatography*, N.Y., John Wiley & Sons, Inc., 1971, pp. 236, 237, & 248–255.

*Primary Examiner*—Robert H. Spitzer
*Assistant Examiner*—Ivars Cintins
*Attorney, Agent, or Firm*—Oblon, Fisher, Spivak, McClelland & Maier

[57] ABSTRACT

Peptides are separated by passing a solution of peptides and an eluent through a column containing a crosslinked hard type starch gel whereby peptides and/or other components are non-fractionally or fractionally separated.

11 Claims, 1 Drawing Figure

METHOD OF SEPARATING PEPTIDES

BACKGROUND OF THE INVENTION

1. Field Of The Invention

The present invention relates to a method of separating peptides having different properties.

2. Description Of The Prior Arts

It has been known to separate the peptides having specific properties by the counter-current distribution method, the electrophoresis and the chromatography method.

These conventional methods have various disadvantages and a satisfactory method of separating peptides has not been attained.

In the counter-current distribution method, a large amount of a solvent should be used because peptides are partitioned into two kinds of inmiscible solvents utilizing the difference of partition coefficients of the solvents. An automatic device used for the method has been proposed. However, it takes a long operation time for the separation.

In the method of separation by the electrophoresis, peptides are separated under utilizing the difference of charge condition of peptide molecules. The operation is not simple to need skill and the separation can not be perfectly attained to be low reproducible.

In the chromatography method, the ion-exchange chromatography method utilizing ion-exchange functions of peptides and the gel filtration chromatography method utilizing difference of molecular sizes of peptides have been practically used.

However, in the condition of the separation of peptides by the ion-exchange chromatography method, the ion-exchangeabiities of peptides are highly varied depending upon kinds and combinations of the amino acid components in the peptides. Accordingly, the set of the condition for the separation of peptides is complicate in comparison with that of amino acids. It is difficult to set the optimum condition.

On the other hand, in the gel filtration chromatography method for separating peptides depending upon the molecular size of the peptides, a gel having pore size for receiving the peptides is used. Accordingly, it is rather easier to set conditions for the separation of peptides in comparison with that of the ion-exchange chromatography method.

However, the commercially available gel used for the gel filtration chromatography method has low strength under high pressure in comparison with the gel used for the ion-exchange chromatography method.

Moreover, it takes a long time for separating peptides as it is reported to take 2 hours to 5.5 hours for eluting all components in the separation of amino acids, dipeptides and tripeptides with Sephadex G-15 (commercially available dextran gel) as described in Journal of Chromatography 48 544 (1970). Moreover, the separatability is not satisfactory by the method. Accordingly, the gel filtration chromatography method is not so often employed as the ion-exchange chromatography method.

SUMMARY OF THE INVENTION

It is an object of the present invention to overcome the disadvantages and to provide a method of separating peptides and other components from a solution of peptides by a simple speedy operation.

The foregoing and other objects of the present invention have been attained by separating peptides by passing a solution of peptides and an eluent through a column containing a crosslinked hard type starch gel whereby peptides and/or other components are non-fractionally or fractionally separated.

DETAILED DESCRIPTION OF PREFERRED EMBODIMENTS

Figure 1:
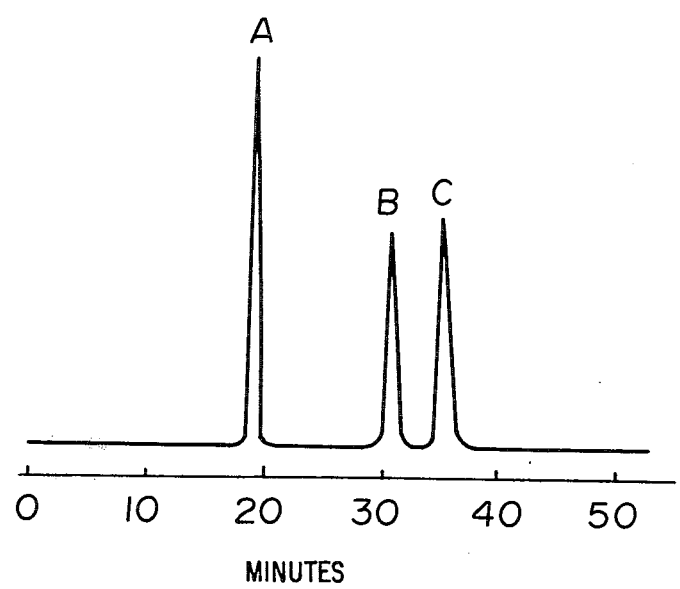

Peptides are organic compounds having peptide bonds two or more amino acid components and peptides are classified as oligopeptides polypeptides and macropeptides depending upon the number of the amino acid units. In the present invention, peptides having 2 to about 100 of amino acid units are used. The solution of peptides is obtained by a partial decomposition of natural protein or by a reaction step for peptides synthesis.

The former is important for an analysis of amino acids of peptides which are obtained by a special cut of peptide bonds in a protein and a separation of the peptides in the serial steps for determining the structure of natural protein. The process for separating peptides is quite important technologically.

On the other hand, in the latter, various peptide syntheses have been developed. The basic reaction is to form a peptide bond by bonding the carboxyl group of an amino acid and amino group of the other amino acid under a condensation as the following reaction equation (1).

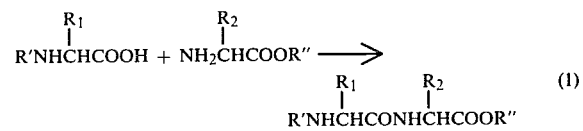

wherein R' represents a protective group for the amino group and R" represents a protective group for the carboxyl group; and $R_1$ and $R_2$ respectively represent amino acid side chains.

The protective groups have the function of protecting a side reaction and inhibiting the polarity of the amino acid to result in higher solubility in an organic solvent.

After the synthesis of a peptide having the protective group, the protective group can be separated by a suitable method to obtain the dipeptide in the free form.

It is also possible to selectively separate only the protective group for the amino group and to bond the product to the other amino acid having the protective group for the amino acid to obtain a tripeptide having protective group for the amino acid. Thus, the synthesis of peptide can be repeated to obtain larger peptides.

Among the peptides, dipeptides are useful as intermediates for syntheses of various polypeptides and dipeptides themselves are important, for example, α-L-aspartyl-L-phenylalanine lower esters e.g. α-L-aspartyl-L-phenylalanine methyl ester is important as a sweetener having the sweetness of saccharose.

These peptides have different properties depending upon kinds of the amino acid components and the number of the amino acid units in the peptides. These peptides have special properties such as different solubilities, for example, soluble in an organic solvent; or soluble in a dilute salt solution but insoluble in water; or insoluble in water or pure ethanol but soluble in 50% ethanol. The special properties of the peptides are complicated ones in comparison with amino acids.

From the viewpoints of the separating function, the time required for analysis and the rate of treating the sample, the crosslinked hard type starch gel should have the following physical and chemical properties.

The crosslinked hard type starch gel is prepared by using a crosslinking agent.

Suitable crosslinking agents used in the preparation of the gel include divinyl compounds such as divinyl benzene, 1,5-hexadiene-3-in, hexatriene, divinyl ether and divinyl sulfone; and diallyl compounds such as allyl phthalate, 2,6-diacryl phenol and diallyl carbinol. It is optimum to use the crosslinked hard type starch gel prepared by using divinyl sulfone as the crosslinking agent.

The crosslinked hard type starch gel can be obtained by stirring starch with a crosslinking agent at a ratio of 0.1–0.5 g of the crosslinking agent to 1 g of starch, in the alkaline condition at room temperature to 100° C. for 1 to 6 hours and then, washing and classifying particle size.

The gel prepared by crosslinking with divinyl sulfone has the mechanical strength being durable under the pressure of at least 200 Kg/cm$^2$.

It is preferable to use the gel which has particle diameter of 5 to 177μ. In order to further improve the separation of peptides, it is especially preferable to use the gel which has fine particle diameter of 5 to 25μ. It is optimum to use the porous gel which has substantially uniform pore diameter in the range of 13 to 1250 Å. The crosslinked hard type starch gel which has out of the range of the pore diameter is not suitable for precision separation of peptides.

On the other hand, the separation of peptides under the same condition by using the conventional crosslinked dextran gel, the polyacrylamide gel or the agarose gel is not practically carried out because of the pulverization of the gel.

The silica type gels and the glass type gels as the porous hard type gel can not be used because of high adsorption of peptides.

From these facts, the special features of the condition and the gel used in the method of the present invention can be understood.

The solution of peptides can be the solution in which peptides are dissolved.

The eluent used in the method of the present invention can be the eluent in which peptides are dissolved in stable and which wets the crosslinked hard type starch gel. It is preferable to use an aqueous solution containing a salt, an acid or a base or a mixed medium of water and non-aqueous medium as the eluent.

When peptides having a basic functional group at the terminal or the side chain i.e. water soluble peptides are separated, it is necessary to take care of the control of the concentration of the salt or the acid because the peptides are easily adsorbed on the gel if an aqueous solution having low concentration of the salt or the acid is used as the eluent.

The kinds of the salts, the acids and the bases are not critical.

Suitable salts include sodium acetate, sodium phosphate. ammonium phosphate, sodium citrate, sodium chloride, ammonium chloride, sodium borate, sodium bicarbonate and ammonium bicarbonate.

Suitable acids include hydrochloric acid, acetic acid, formic acid, phosphoric acid and citric acid.

Suitable bases include sodium hydroxide, ammonium hydroxide, sodium carbonate, and ammonium carbonate.

The potassium compounds such as potassium acetate, phosphate, citrate, chloride, borate, bicarbonate, hydroxide and carbonate are also preferable.

In the separation of hydrophobic peptides having non-polar group at the terminal or the side chain, an aqueous solution containing a salt, an acid or a base can be also used as the eluent as the separation of the water soluble peptides.

However, in this case, adsorption of the peptides is remarkably increased when the concentration of the salt is too high. Accordingly, it is preferable to use a mixed medium of water and non-aqueous medium.

The non-aqueous medium is an organic medium which is miscible with water.

Suitable non-aqueous media include alcohols having 1 to 4 carbon atoms such as methyl alcohol, ethyl alcohol, iso-propyl alcohol and n-propyl alcohol, tetrahydrofuran, acetonitrile and pyridine.

The crosslinked hard type starch gel is relatively stable in an aqueous solution of an acid or a base, and it is especially acid resistant. Accordingly, the pH of the eluent used in the method of the present invention can be in a range of 1 to 12.

It is preferable to use the eluent having pH of 2 to 11 because there is possibility to damage the crosslinked structure at lower or higher pH for a long operation.

As described, in accordance with the method of the present invention, it is possible to separate peptides depending upon sizes of the molecules of the peptides, in sequency though it could not be attained by the conventional method. The separation of the peptides can be attained by a simple speedy operation.

The method of separating peptides may contribute for the study of amino acid components in natural protein and the study of syntheses of peptides.

The present invention will be further illustrated by certain examples.

EXAMPLE 1

As a sample, 5 ml of a mixture of N-benzyloxycarbonyl-L-aspartic acid, L-phenylalaninyl methyl ester hydrochloride and N-benzyloxycarbonyl-L-aspartyl-L-phenylalanine methyl ester was used.

A crosslinked hard type starch gel having particle diameters of 5 to 10μ and pore diameters of 800 to 1000 Å (LS-170 manufactured by Toyo Soda Manufacturing Co., Ltd.) was packed in a column having a diameter of 3.5 cm and a length of 60 cm, and 0.05 Mol aqueous solution of sodium acetate was continuously fed as an eluent at a flow rate of 1.0 ml/min under the pressure of 3.4 Kg/cm$^2$ and the sample was charged into the column to separate the three compounds in the sample. The three components were respectively separated in the eluent discharged in the periods of 32 to 40 minutes; 56 to 64 minutes and 66 to 74 minutes respectively.

Each separated solution was analyzed by the chromatography apparatus used in Example 2.

As the result, it was confirmed that three components were perfectly separated and recovered.

EXAMPLE 2

The crosslinked hard type starch gel used in Example 1 was filled in a stainless steel column for high speed liquid chromatography having a diameter of 7.5 mm and a length of 30 cm. The column was connected to the chromatography apparatus HLC-802 UR (manufactured by Toyo Soda Manufacturing Co., Ltd.) and 0.05 Mol aqueous solution of sodium acetate was used as the eluent to pass through it at a flow rate of 0.8 ml/min under the pressure of 30 Kg/cm$^2$ and 10 μl of the sample used in Example 1 was charged into the chromatography apparatus whereby the chromatogram shown in FIG. 1 was obtained.

The concentrations of the three components of N-benzyloxy-carbonyl-L-aspartic acid(A), L-phenylalaninyl methyl ester hydrochloride(B) and N-benzyloxycarbonyl-L-aspartyl-L-phenylalanine methyl ester(C) in the sample could be quantatively measured from the peak areas of the chromatogram.

FIG. 1 shows the chromatogram obtained by the separation of the three components by the method of Example 2.

As it is clear from FIG. 1, the time required for the separation of the three components was quite short as 40 minutes, and the three components were separated by the simple operation.

EXAMPLE 3

A crosslinked hard type starch gel having particle diameters of 15 to 20μ and pore diameters of 200 to 250 Å or a dextran gel having substantially the same particle diameters and pore diameters (Sephadex G-50 super fine) was respectively packed in the column having a diameter of 7.5 mm and a length of 120 cm and 0.05 Mol aqueous solution of sodium acetate was passed.

A sample was prepared by dissolving 0.5 g of glycylglycylglycine and 0.5 g of glycine in 500 ml of water and 100 μl of the sample was charged into the column and the separation of glycylglycylglycine and glycine was carried out under the conditions of the flow rates and the pressure in the column shown in Table 1.

The results are shown in Table 1. As it is clear from the results shown in Table 1, the separation was smoothly carried out without any adverse effect for the crosslinked hard type starch gel under the pressure of 0.5 to 30 Kg/cm$^2$.

On the other hand, when the dextran gel was used, the separation could not be carried out under the pressure of higher than 1 Kg/cm$^2$.

The dextran gel was discharged from the column after the operation and it was observed to find the fact that the gel was pulverized.

Table 1

| Pressure (Kg/cm$^2$) | Crosslinked hard type starch gel (flow rate ml/min.) | | Dextran gel (flow rate ml/min.) | |
|---|---|---|---|---|
| 30 | ⊙ | (1.8) | X | — |
| 20 | ⊙ | (1.2) | X | — |
| 10 | ⊙ | (0.6) | X | — |
| 5 | ○ | (0.03) | X | — |
| 1 | ○ | (0.06) | X | — |
| 0.5 | ○ | (0.03) | ○ | (0.1) |

⊙ speedy and good separation
○ good separation
X no separation

EXAMPLE 4

A crosslinked hard type starch gel having particle diameters of 15 to 20μ and pore diameters of 200 to 250 Å was packed in a column having a diameter of 7.5 mm and a length of 60 cm, and 0.05 Mol aqueous solution of acetic acid was passed as the eluent at a flow rate of 0.8 ml/min. under the pressure of 58 Kg/cm$^2$.

As the sample, 100 μl of a reaction obtained by a hydrogenation of N-benzyloxycarbonyl-L-aspartyl-L-phenylalanine methyl ester to form L-aspartyl-L-phenylalanine methyl ester was charged into the column and the separating operation was continuously repeated for 2 months in order to measure the yield in the hydrogenation. However, the function of separation was not decreased.

On the other hand, the separating operation was repeated except using 1 Mol aqueous solution of hydrochloric acid as the eluent of a strong acid, to study the condition of the separation. As the result, the solution could not passed after 1 week.

When the separating operation was repeated except using 1 Mol aqueous solution of sodium hydroxide as the eluent of a strong base, the solution could not passed after 1 week.

EXAMPLE 5

A crosslinked hard type starch gel having particle diameters of 10 to 15μ and pore diameters of 50 to 150 Å was packed into a column having a diameter of 7.5 mm and a length of 120 cm and a mixed medium of water and methyl alcohol (3:97 by vol.) was passed through it at a flow rate of 0.8 ml/min under the pressure of 1.5 Kg/cm$^2$.

A sample solution was prepared by dissolving 2 mg of N-benzyloxycarbonyl-glycylglycine methyl ester and 2 mg of N-benzyloxycarbonyl-glycylglycylglycine methyl ester in 10 ml of methyl alcohol and 100 μl of the sample solution was charged into the column. As the result, the separation of the two components was smoothly carried out.

On the other hand, the separating operation was repeated except using 0.6 Mol conc. aqueous solution of sodium acetate as the eluent. As the result, the two components were adsorbed and were not eluted.

EXAMPLE 6

A crosslinked hard type starch gel having particle diameters of 15 to 20μ and pore diameters of 200 to 250 Å was packed into a column having a diameter of 7.5 mm and a length of 60 cm and 0.01 Mol aqueous solution of sodium hydroxide (pH of 12) was passed through it at a flow rate of 1.0 ml/min. under the pressure of 8.3 Kg/cm$^2$.

A sample solution was prepared by dissolving 2 mg of glycylglycylphenylalanine and 2 mg of phenylalanine-glycylglycine in 10 ml of water and 100 μl of the sample solution was charged into the column. As the result, the two components were separated.

When the separating operation was repeated except using 0.1 Mol aqueous solution of sodium chloride as the eluent, the separation of the two components was improved.

When the separating operation was repeated except using 0.2 Mol aqueous solution of acetic acid (pH of 2.7), the separation of the two components was further improved.

REFERENCE 1

The commercially available dextran (Sephadex G-25) was packed into a column having a diameter of 4.2 cm and a length of 200 cm and 0.2% aqueous solution of ammonium bicarbonate was passed through it as the eluent at a flow rate of 50 ml/hour.

As the sample, a mixture of oligomers of condensates of pentapeptides (tyrosyl-leucyl-prolyl-glutamylphenylalanine) were separated by charging it into the column.

As the result, the pentamer, tetramer, trimer, dimer and monomer were separated as desired. However, it took longer than 40 hours.

What is claimed is:

1. A method of separating peptides by gel permeation chromatography which comprises passing a solution of peptides and an eluent through a column containing a cross-linked hard type starch gel at a pressure of at least 1 kg/cm$^2$ whereby said peptides are separated.

2. A method according to claim 1 wherein the cross-linked hard type starch gel has a mechanical strength being durable to the pressure of at least 200 Kg/cm$^2$ and has an average particle diameter of 5 to 177μ and an average pore diameter of 13 to 1250 Å.

3. A method according to claim 1 or 2 wherein the eluent is an aqueous solution of a salt, an acid or a base having pH of 1 to 12.

4. The method according to claim 2 wherein said average pore diameter is 5 to 25μ.

5. A method according to claim 1 wherein the eluent is a mixed medium of water and a non-aqueous medium.

6. A method according to claim 5 wherein said non-aqueous medium comprises at least one compound selected from the group consisting of $C_1$–$C_4$ alcohols, tetrahydrofuran, acetonitrile and pyridine.

7. A method according to claim 1 wherein said peptides are fractionally separated.

8. A method according to claim 1 wherein said peptides are separated non-fractionally.

9. A method according to claim 1 wherein said cross-linked starched gel is cross-linked with an agent selected from the group consisting of divinyl benzene, 1,5-hexadiene-3-in, hexatriene, divinyl ether, divinyl sulfone, allyl phthalate, 2,6-diacryl phenol and diallyl carbinol.

10. The method according to claim 9 wherein said agent is divinyl sulfone.

11. A method according to claim 1 wherein said eluent has a pH of from 2 to 11.

* * * * *